(12) United States Patent
Anstey et al.

(10) Patent No.: US 7,810,889 B2
(45) Date of Patent: Oct. 12, 2010

(54) DIGITAL DATABUS

(75) Inventors: Nigel Anstey, Chippenham (GB); Derek Tate, Chippenham (GB)

(73) Assignee: Knorr-Bremse Rail Systems (U.K.), Wiltshire (GB)

( * ) Notice: Subject to any disclaimer, the term of this patent is extended or adjusted under 35 U.S.C. 154(b) by 378 days.

(21) Appl. No.: 10/561,197

(22) PCT Filed: Jun. 16, 2004

(86) PCT No.: PCT/GB2004/002575

§ 371 (c)(1),
(2), (4) Date: Sep. 15, 2006

(87) PCT Pub. No.: WO2004/113140

PCT Pub. Date: Dec. 29, 2004

(65) Prior Publication Data
US 2007/0096548 A1   May 3, 2007

(30) Foreign Application Priority Data
Jun. 18, 2003  (GB) ................... 0314184.3

(51) Int. Cl.
*B60T 13/70* (2006.01)
(52) U.S. Cl. .............................. 303/15; 303/7
(58) Field of Classification Search ........ 303/3, 303/7, 15
See application file for complete search history.

(56) References Cited

U.S. PATENT DOCUMENTS

| | | | | |
|---|---|---|---|---|
| 4,522,450 A * | 6/1985 | Heilhecker et al. | ............. | 303/9 |
| 4,660,146 A * | 4/1987 | Kubo | ............. | 701/79 |
| 5,887,953 A * | 3/1999 | Wood et al. | ............. | 303/7 |
| 6,062,657 A * | 5/2000 | Dimasi | ............. | 303/122.13 |
| 6,840,587 B2 * | 1/2005 | Eberle et al. | ............. | 303/131 |
| 6,945,611 B2 * | 9/2005 | Mayer et al. | ............. | 303/122.06 |
| 6,991,301 B2 * | 1/2006 | Aurich et al. | ............. | 303/15 |
| 2001/0035049 A1* | 11/2001 | Balch et al. | ............. | 73/488 |
| 2001/0037167 A1* | 11/2001 | Barberis et al. | ............. | 701/19 |
| 2005/0085961 A1* | 4/2005 | Kane et al. | ............. | 701/19 |
| 2005/0099061 A1* | 5/2005 | Hollandsworth et al. | ....... | 303/7 |

FOREIGN PATENT DOCUMENTS

| | | |
|---|---|---|
| DE | 3127033 | 4/1982 |
| DE | 3639416 | 11/1987 |
| EP | 0855320 | 7/1998 |
| EP | 1266814 | 12/2002 |

* cited by examiner

*Primary Examiner*—Christopher P Schwartz
(74) *Attorney, Agent, or Firm*—Barnes & Thornburg LLP

(57) ABSTRACT

A brake system for a railway vehicle (10), wherein the axles (3, 6) of the vehicle are provided with axle speed sensors (1, 2, 4, 5) adapted to measure the speed of rotation of the respective axle. The output of the axle speed sensor being fed to a data processor (7), which is provided with local intelligence so as to permit individual control of brake pressure on each axle or, alternatively on each bogie or car. The data processor (7) communicates, in use, with a brake control unit via a databus (18), the sensor outputs being processed so that the data can be communicated between the data processor (7) and further data processors (17), which further data processors are adapted to process sensor outputs on further axles or bogies.

10 Claims, 4 Drawing Sheets

DIGITAL DATABUS

The invention relates to a brake system for a railway vehicle, in particular a brake system incorporating wheel slide and/or wheel spin protection.

Railway vehicle braking systems incorporating wheel slide control and wheel spin control have established themselves in recent years. Both wheel slide and wheel spin stem from low wheel to rail adhesion. Wheel slide typically occurs when braking a railway car and wheel spin when the car is accelerating.

A typical wheel slide control system comprises a plurality of sensors on each axle of the vehicle, which sensors are adapted to measure the speed of rotation of the axle. The sensors are individually wired back to, a central vehicle brake control unit. In use, the outputs of the sensors are then fed to the brake control unit, which compares the values with those of adjacent axles and if the difference exceeds a pre-determined limit, releases and re-applies the brake pressure until the speed falls within acceptable limits.

This system has proven itself in practice and leads to improved braking performance and reduces the probability of damage to wheels and track. However, the known solutions use a sampling cycle of 10 ms, which requires a significant amount of resources, back to the brake control unit, which is usually located on the vehicle drive unit.

According to the invention there is provided a brake system for a railway vehicle, which vehicle comprises a plurality of bogies, each of which bogies has at least one axle, wherein at least some of said axles are provided with axle speed sensors adapted to measure the speed of rotation of the respective axle, the output of the axle speed sensor being fed to a data processor, wherein the data processor is provided with local intelligence so as to permit individual control of brake pressure on each axle or bogie or car, the data processor being adapted to communicate with a brake control unit via a databus, the sensor outputs being processed so that the data can be communicated between the data processor and further data processors, which further data processors are adapted to process sensor outputs on further axles or bogies.

Preferably, wherein each axle is provided with at least one axle speed sensor.

Preferably, wherein the databus comprises a network cable or a radio link. Preferably, at least one bogie per car is provided with a brake control unit adapted to provide wheel spin and/or wheel slide control on axles on that bogie. Preferably, the data processor for each bogie on the car is adapted to communicate with the brake control unit via the axle speed sensors. Preferably, each bogie per car is provided with a brake control unit adapted to provide wheel spin and wheel slide control on axles on that bogie.

In a preferred embodiment, the system is installed in a multiple vehicle having a databus extending substantially along said multiple vehicle, wherein the brake pressure on one axle per multiple unit vehicle is forcibly released so as to permit determination of the ground speed of the vehicle. Preferably, the brake pressure on two axles is forcibly released to determine the ground speed. Preferably, a further databus is provided in parallel to the first databus to provide redundancy.

Exemplary embodiments of the invention will now be described in greater detail with reference to the drawings in which.

Figure 1:
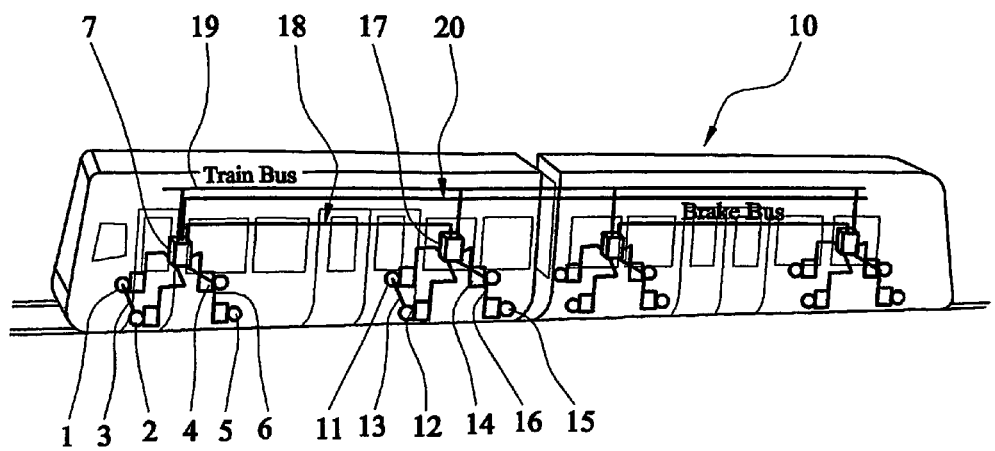
FIG. 1 shows a schematic of a railway vehicle brake system.

FIG. 1 shows a schematic of a brake system for a railway vehicle 10 comprising first and second axle speed sensors 1,2 adapted to measure the speed of an axle 3 and third and fourth speed sensors 4,5 adapted to measure the speed of a second axle 6 on the same bogie as axle 3. The output of the axle speed sensors is then fed to a data processing unit 7, where the signals are processed. The data processor undertakes the signal processing of the speed sensor outputs and can provide logical instructions to the brake actuators.

The second bogie of the car 10 also comprises first and second axle speed sensors 11,12 adapted to measure the speed of an axle 13 and third and fourth speed sensors 14,15 adapted to measure the speed of a second axle 16 on the same bogie as axle 13. The output of the axle speed sensors is then fed to a further data processing unit 17, where the signals are processed. The processed signals are then fed via an in-car bus 18 to the data processing unit 7.

The data processing unit 7 is connected to a train bus 19, which runs along the entire length of the vehicle. To ensure safety a redundant emergency loop 20 is provided. The train is provided with a main brake control unit 25 which is connected to the train bus 19 and emergency loop 20 and in use provides the main brake actuation signal to the data processing units 7 and 17. The data processing units 7 and 17 are provided with local intelligence to permit a distributed control over the brake system. Under a distributed control system the brake pressure is applied on a per bogie basis rather than on a per car basis as with conventional braking systems.

As the control of the brakes is determined locally and there is no need for the axle speed sensor to supply a signal to a central data processing unit, which then has to apply a pneumatic signal to the braking system. Due to the speed at which such signals can be transmitted, in known systems the axle speed is typically sampled at 10 ms intervals for the wheel slide protection to be effective. The introduction of local or distributed control of the brake pressure permits a much slower cycle time to be used and it is possible to match the performance of wheel slide protection using cycles an order of magnitude longer.

To enable communication between the locally intelligent brake valves and data processing units 7,17, the vehicle is effectively networked using the train bus 19. As an alternative to the train bus 19, it would be possible to use a radio link.

In the event of failure of a brake unit, the local control of brake pressure within a network has a further advantage in that it allows for intelligent failure management. In a standard braking system, the brake pressure to be applied is determined centrally and although the pressure applied at individually axles may vary in some systems to allow a smoother braking performance, this occurs in a pre-determined manner. In the event of failure there is simply a loss of performance. With local control, when a fault is detected, it is possible to increase the brake pressure on adjacent bogies to compensate for the loss of the brake pressure at one axle or bogie to allow for the missing brake performance of the inoperative unit.

A standard method of determining the vehicle ground speed of a moving train is to measure the true axle speed by forced release of one axle per vehicle, in which the brake pressure at one axle is released so that the axle then accelerates to the actual vehicle speed. The actual vehicle speed can be determined once the acceleration falls within a predefined level. For multiple unit trains, this has a considerable disadvantage in that the braking effort will be diminished if more than one axle per vehicle is released. As in a multiple unit the databus will generally extend along the whole of the vehicle, only one axle need be released per vehicle. Although the distributed intelligence can compensate for the loss of performance, the temporary loss of brake pressure at one axle will not unduly affect performance. In some cases, the forced release of a single axle can give a false signal. For safety reasons, the release of two axles per databus segment would provide a more accurate figure.

FIGS. 2 to 5 show schematically various variations on the brake system architecture, where like numbers refer to like parts in the preceding description.

Figure 2:
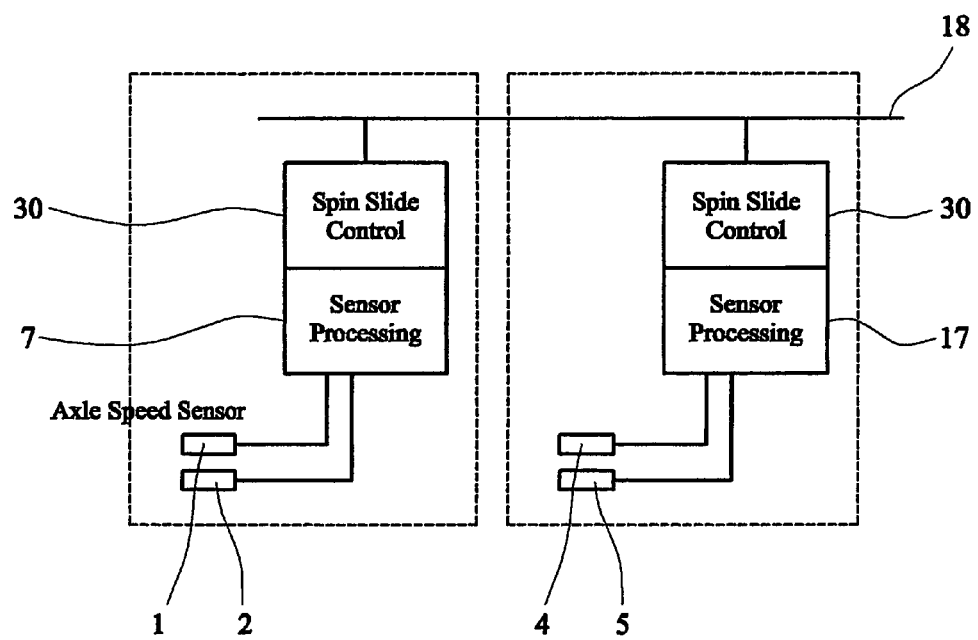
FIG. 2 shows a brake system architecture.

FIG. 2 shows an architecture in which each data processor 7 is provided with an associated wheel slide protection control unit for two axles with two sensors 1,2,4,5 each being associated with a respective axle. The output of sensors 1,2 is fed to the data processor 7. The data processor 7 converts the sensor outputs to the appropriate digital format and then passes the signal to the wheel slide protection control unit 30. The unit 30 is also adapted to provide wheel spin control but in some instances, wheel spin control may be provided by other means. The output of sensors 4,5 is fed to a further data processor 17, which is provided with its own wheel slide and spin control unit. The combined data processor and wheel slide control unit function as a brake control unit, which in use can control the brake pressure independently of the main brake control unit 25. The wheel slide/spin control unit is connected to the digital databus and in use can therefore communicate with other brake control units associated with other bogies on the vehicle. The system therefore provides distributed brake control.

Figure 3:
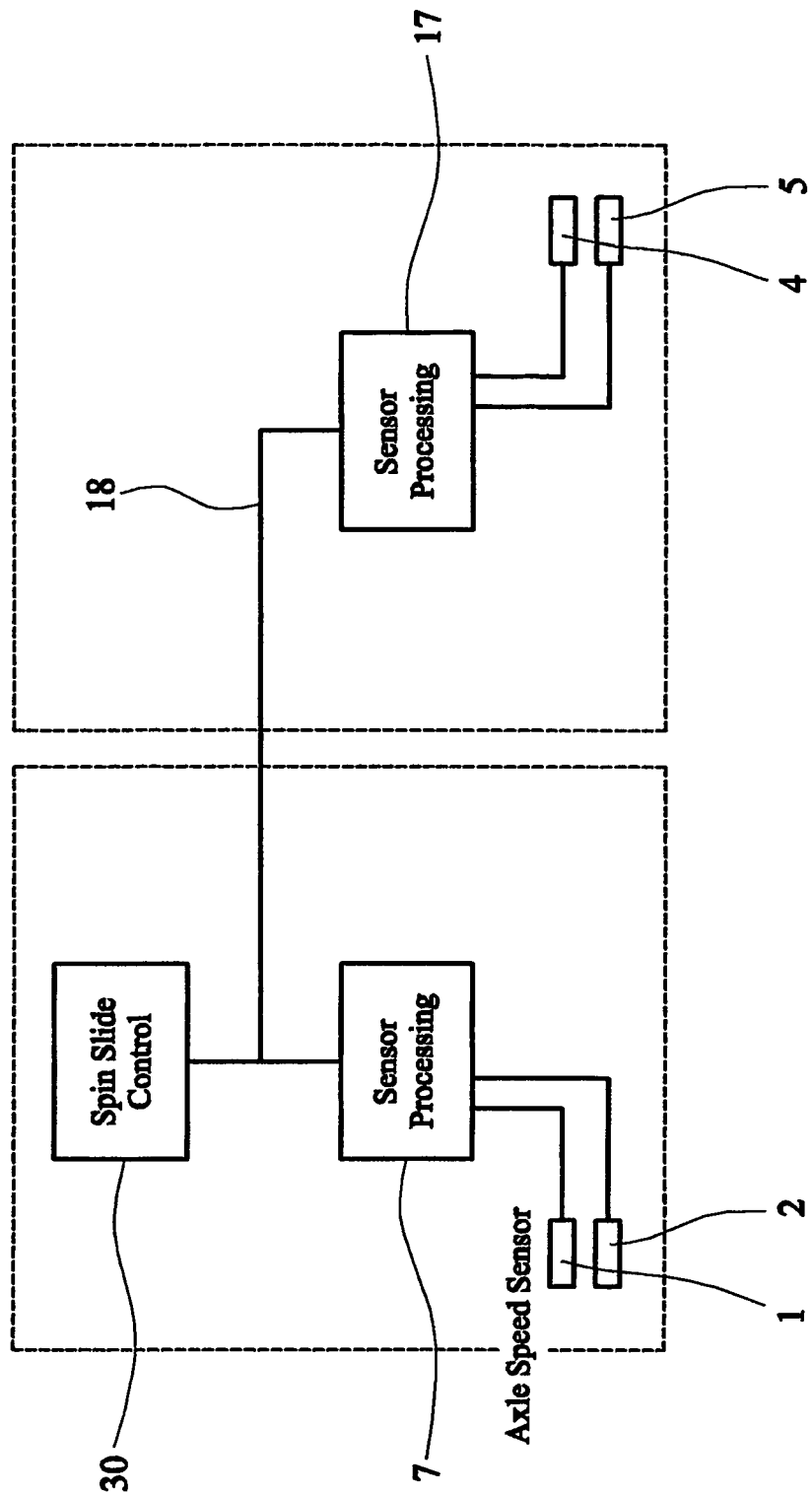
FIG. 3 shows a second brake system architecture.

FIG. 3 shows an architecture for a two bogie car, again comprising four sensors 1,2,4,5, with one sensor being provided per axle. It would also be possible to have two sensors per axle. In this case the sensors 1,2 output signals to a first data processor 7 and the sensors 4,5 to a second data processor 17. The data processors 7 and 17 are spatially located in the vicinity of the respective bogie, which reduces the amount of cabling required. The processed output of the data processors 7 and 17 is transmitted to the databus 18. The wheel slide protection control unit 30 is also connected to the databus 18 and is adapted to control the brake system.

Figure 4:
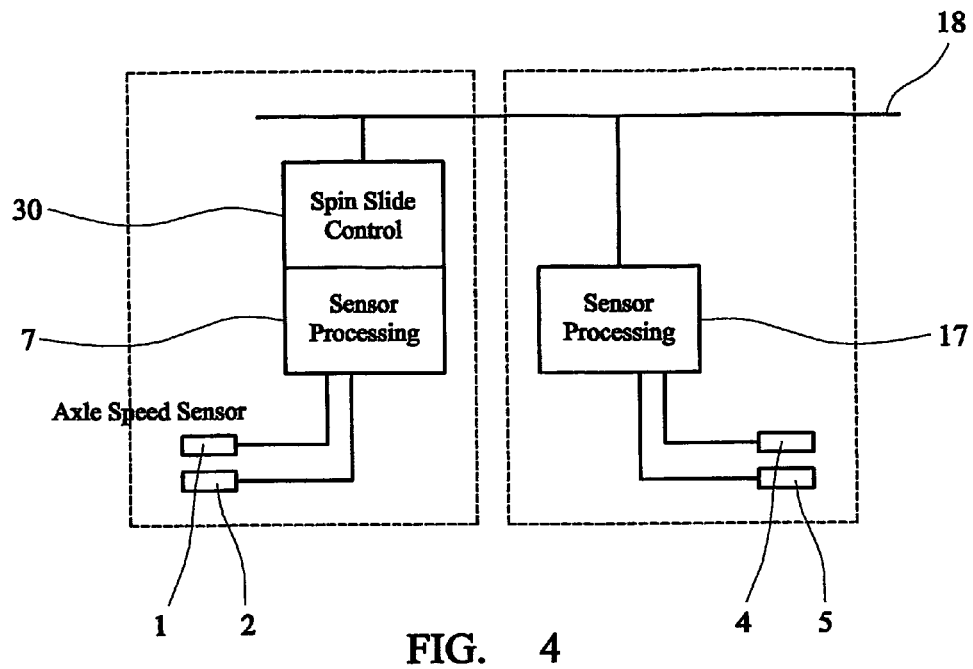
FIG. 4 shows a third brake system architecture.

FIG. 4 shows an architecture for a two bogie car and a further bogie from an adjacent car. In this variant wheel slide protection control unit 30 is adapted to control the wheel slide protection on the adjacent car as well as the car on which it is physically located. This has some benefits in reducing material costs and weight savings without compromising performance.

Figure 5:
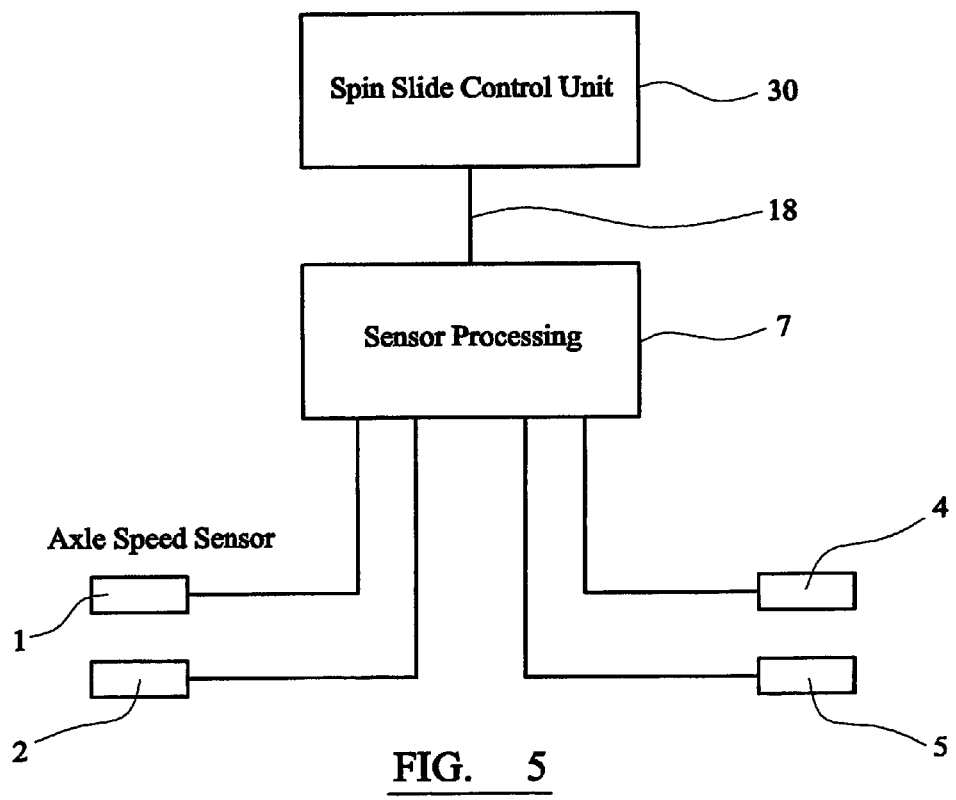
FIG. 5 shows a fourth brake system architecture.

FIG. 5 shows the simplest architecture for a single bogie with four sensors 1,2,4,5 feeding to a data processor 7. The data processor 7 converts the sensor outputs to the appropriate digital format and then passes the signal via the databus 18 to the wheel spin and/or slide protection control unit 30.

Figure 6:
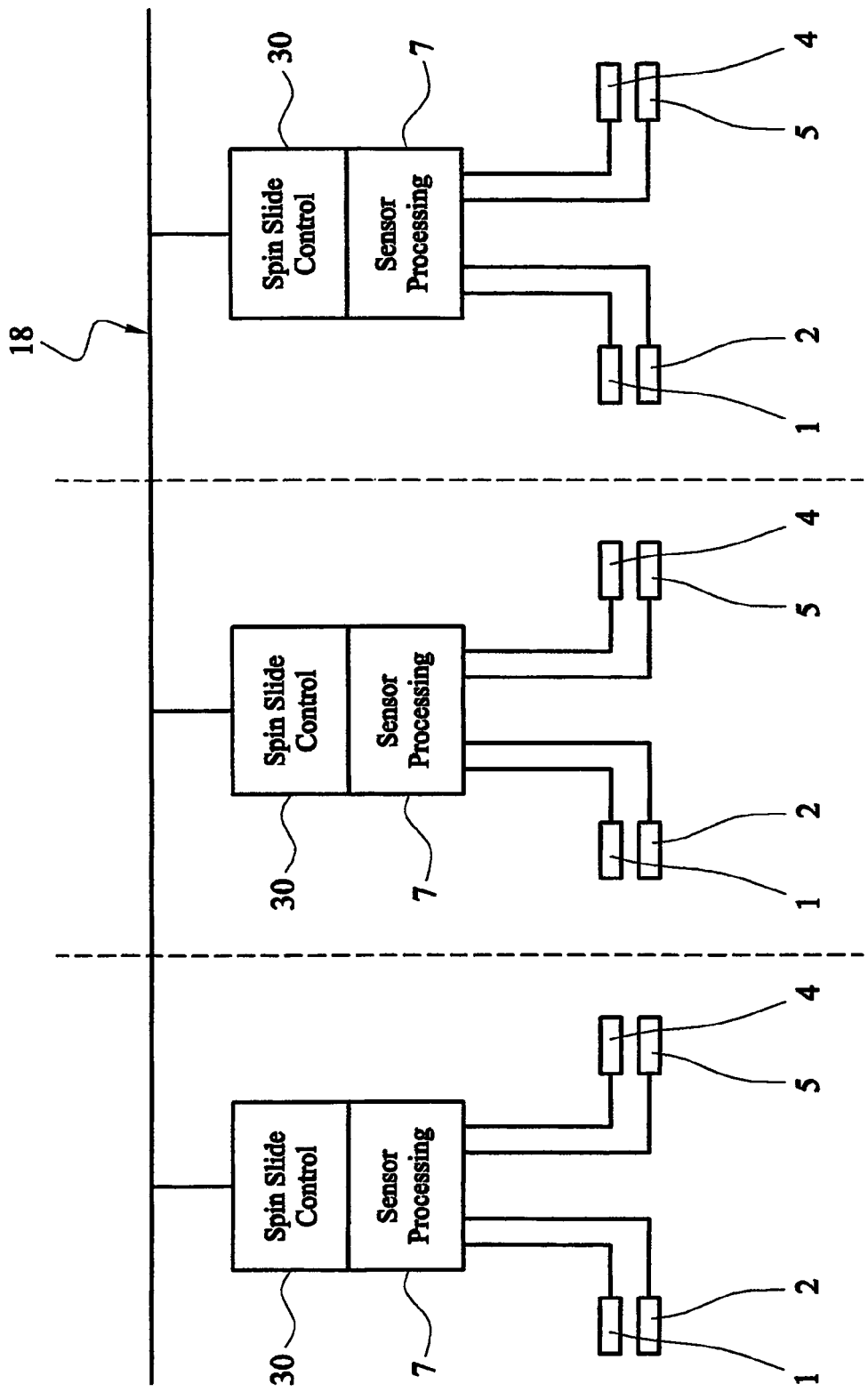

FIG. 6 shows a further embodiment, in which only one data processor 7 and wheel slide control unit 30 is provided per car. Axle speed sensors 1,2,4,5 are provided on a per axle or per bogie basis and the output of the sensors is then fed back to the data processor 7, which then passes the signal to the databus 18.

Although the commonest form of bogie in modern railway systems comprises a plurality of axles mounted on a support which also provides the suspension between the wheel/axle and the body of the vehicle, the term bogie should be understood as also encompassing a single axis system, where a single axle is connected to a body via a bogie, the bogie being the connection between the axle and the body, such as the suspension.

The invention claimed is:

1. A brake system for a railway vehicle, which vehicle comprises a plurality of bogies, each of which bogies has at least one axle, wherein at least some of said axles are provided with axle speed sensors adapted to measure the speed of rotation of the respective axle, the output of the axle speed sensor being fed to a data processor, wherein the data processor is provided with local intelligence so as to permit individual control of brake pressure on each axle or bogie or car, the data processor being adapted to communicate with a brake control unit via a databus, the sensor outputs being processed so that the data can be communicated between the data processor and further data processors, which further data processors are adapted to process sensor outputs on further axles or bogies, wherein the data processor is provided with a wheel slide control unit, which data processor and wheel slide control unit cooperate to function as a bogie-specific brake control unit, which, in use, controls the brake pressure independently of the main brake control unit, wherein the wheel slide control unit is connected to the databus so that the wheel slide control unit communicates with other bogie-specific brake control units associated with other bogies on the vehicle.

2. A brake system according to claim 1, wherein each axle is provided with at least one axle speed sensor.

3. A brake system according to claim 1, wherein the databus comprises a network cable or a radio link.

4. A brake system according to claim 1, wherein at least one bogie per car is provided with a brake control unit adapted to provide at least one of wheel spin and wheel slide control on axles on that bogie.

5. A brake system according to claim 1, wherein each bogie per car is provided with a brake control unit adapted to provide at least one of wheel spin and wheel slide control on axles on that bogie.

6. A brake system according to claim 1, wherein the system is installed in a railway vehicle comprising multiple vehicles having a databus extending substantially along said multiple vehicles, wherein the brake pressure on one axle per multiple unit vehicle is released so as to permit determination of the ground speed of the vehicle.

7. A brake system according to claim 6, in which the brake pressure on two axles is released to determine ground speed.

8. A brake system according to claim 1, in which a further databus is provided in parallel to the first databus to provide redundancy.

9. A brake system according to claim 1, wherein the intervals are about 100 ms.

10. A brake system according to claim 1, wherein, when a fault is detected, the brake pressure on adjacent bogies is increased to compensate for the loss of the brake pressure at one axle or bogie to allow for the missing brake performance of the inoperative unit.

* * * * *